US008207829B2

(12) United States Patent

De Goederen-Oei et al.

(10) Patent No.: US 8,207,829 B2

(45) Date of Patent: Jun. 26, 2012

(54) METHOD AND DEVICE FOR COMMISSIONING A REMOTE CONTROLLER

(75) Inventors: Ay Ling De Goederen-Oei, Best (NL); Dennis Van De Meulenhof, Helmond (NL); Ian McClelland, Waalre (NL); Wouter Lambertus Petrus Willaert, Eindhoven (NL); Paul Philip Thursfield, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1000 days.

(21) Appl. No.: 12/097,527

(22) PCT Filed: Dec. 12, 2006

(86) PCT No.: PCT/IB2006/054762

§ 371 (c)(1), (2), (4) Date: Jun. 14, 2008

(87) PCT Pub. No.: WO2007/072296

PCT Pub. Date: Jun. 28, 2007

(65) Prior Publication Data

US 2008/0316047 A1 Dec. 25, 2008

(30) Foreign Application Priority Data

Dec. 22, 2005 (EP) .................................... 05112742

(51) Int. Cl.
*G05B 11/01* (2006.01)

(52) U.S. Cl. ..................... 340/12.24; 340/4.3; 340/4.31; 340/4.32; 340/12.23; 340/13.21; 439/246; 439/249

(58) Field of Classification Search ........................ None
See application file for complete search history.

(56) References Cited

U.S. PATENT DOCUMENTS

| | | | | |
|---|---|---|---|---|
| 4,101,805 | A | 7/1978 | Stone | |
| 4,652,860 | A * | 3/1987 | Weishaupt et al. | 340/426.14 |
| 5,121,287 | A | 6/1992 | Lee | |
| 5,148,159 | A * | 9/1992 | Clark et al. | 340/5.25 |
| 6,093,983 | A | 7/2000 | Singh | |
| 6,528,954 | B1 | 3/2003 | Lys et al. | |
| 6,538,571 | B1 * | 3/2003 | Huang | 340/568.1 |
| 6,759,966 | B1 * | 7/2004 | Weng | 340/9.1 |
| 2003/0210167 | A1 * | 11/2003 | Weng | 341/176 |
| 2004/0169466 | A1 | 9/2004 | Suehiro et al. | |
| 2008/0070501 | A1 * | 3/2008 | Wyld | 455/41.2 |

FOREIGN PATENT DOCUMENTS

| | | | |
|---|---|---|---|
| GB | 2325070 | A | 11/1998 |
| GB | 2345367 | A | 7/2000 |
| GB | 2388710 | A | 11/2003 |
| WO | 03069574 | A1 | 8/2003 |

* cited by examiner

*Primary Examiner* — Benjamin C Lee
*Assistant Examiner* — Curtis King
(74) *Attorney, Agent, or Firm* — Mark L. Beloborodov

(57) ABSTRACT

Apparatus and method for commissioning a wireless communication link between a remote controller device (24) that transmits a signal and a remote controlled device (11) that receives the signal include a first button (40) that is recessed within the housing of the remote controller (24) that can be pressed to cause the remote controller (24) to transmit a commissioning signal. A second button (50) that is recessed within the housing of the remote controlled device (11) can be pressed to cause the remote controlled device (11) to receive and learn the commissioning. The remote controller (24) and the remote controlled device (11) have complementary mating structures carried thereon that will simultaneously operate the first and second buttons when the remote controller (24) and the remote controlled device (11) are physically mated with another.

20 Claims, 2 Drawing Sheets

METHOD AND DEVICE FOR COMMISSIONING A REMOTE CONTROLLER

The present invention relates to commissioning a communication link between a remote controller and a remote controlled device.

Most often household lighting and other electrical control systems are hard wired and operated by wall mounted switches. However it is also known to use a wireless remote controller to operate a controlled device located remotely from the controller. Such remotely controlled devices include various multimedia devices, such as televisions, video cassette recorder, DVD and CD players and the like. The remote controller is actuated by the user pushing a button to wirelessly transmit a signal, and the remote controlled device includes a receiver that wirelessly receives the transmitted signal and operates switches and circuitry to control the controlled device.

The use of such wireless remote control systems brings with it the need to establish a functional initializing link between the object that the user wants to control (i.e., the controlled device) and the controller with which to do so, in order for the controlled device becomes responsive to signals from the remote controller. Until today, there are several options existing to establish this initial identifying link, which is also described as 'commissioning'. The most common methods of commissioning are the user dialing the same channel on both the remote controller and the controlled device, or, the user pushing a button on both the remote controller and the controlled device at the same time for a couple of seconds so that the remote controller will transmit a signal and the controlled device will receive and learn the transmitted signal.

Because today's remote control solutions for households are relatively complex in so far as the commissioning process, they most often require installation by professional installers. With the development and proliferation of wireless (RF) technologies and standards like Bluetooth™, Zigbee™ and Zensys™, it is expected that the market for wireless household automation solutions will develop strongly in the next few years.

Other principles of commissioning are currently being examined or defined, making use of existing and new technologies. One of these technologies makes use of RFID's. This technology can be used for commissioning in such a way that a link is established between two modules by bringing the two modules physically close to each other to enable RFID communication between the remote controller and the controlled device.

The disadvantage of existing commissioning principles known or proposed in the marketplace is that they are perceived to be quite technical for the average consumer, thereby in some cases discouraging the extensive use of wireless control systems in the home, for example. The RFID technology may offer a better possibility for establishing the link in a user friendly way, but has a disadvantage because of the relative high cost of the RFID system.

Thus there is the need in the marketplace for new and novel methods and apparatus for creating and commissioning a communication link between a remote controller and a controlled device in an intuitive and user friendly way in order to facilitate the installation and use of remote controlled household systems by the ordinary homeowner who does not possess technical training or experience, for example.

A method and apparatus is provided for commissioning a wireless communication link between a remote controller device that emits a wireless signal and a remote controlled device that receives a wireless signal. A first button that is located on the housing of the remote controller can be pressed to cause the remote controller to transmit a communication signal, and a second button that is located on the housing of the remote controlled device can be pressed to cause the remote controlled device to receive and learn the signal that was transmitted from the remote controller. The remote controller and the remote controlled device have complementary mating structures carried thereon that will simultaneously operate the first and the second buttons when the remote controller and the remote controlled device are physically mated with another, thereby initializing and establishing a communication link between the remote controller and the remote controlled device. The first and second buttons may be recessed into the housings and the complementary mating structures reach into the recesses to operate the buttons.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

These and other features, aspects, and advantages of the apparatus and methods of the present invention will become better understood from the following description, appended claims, and accompanying drawings where:

The following description of certain exemplary embodiment(s) is merely exemplary in nature and is in no way intended to limit the invention, its application, or uses.

Figure 1:
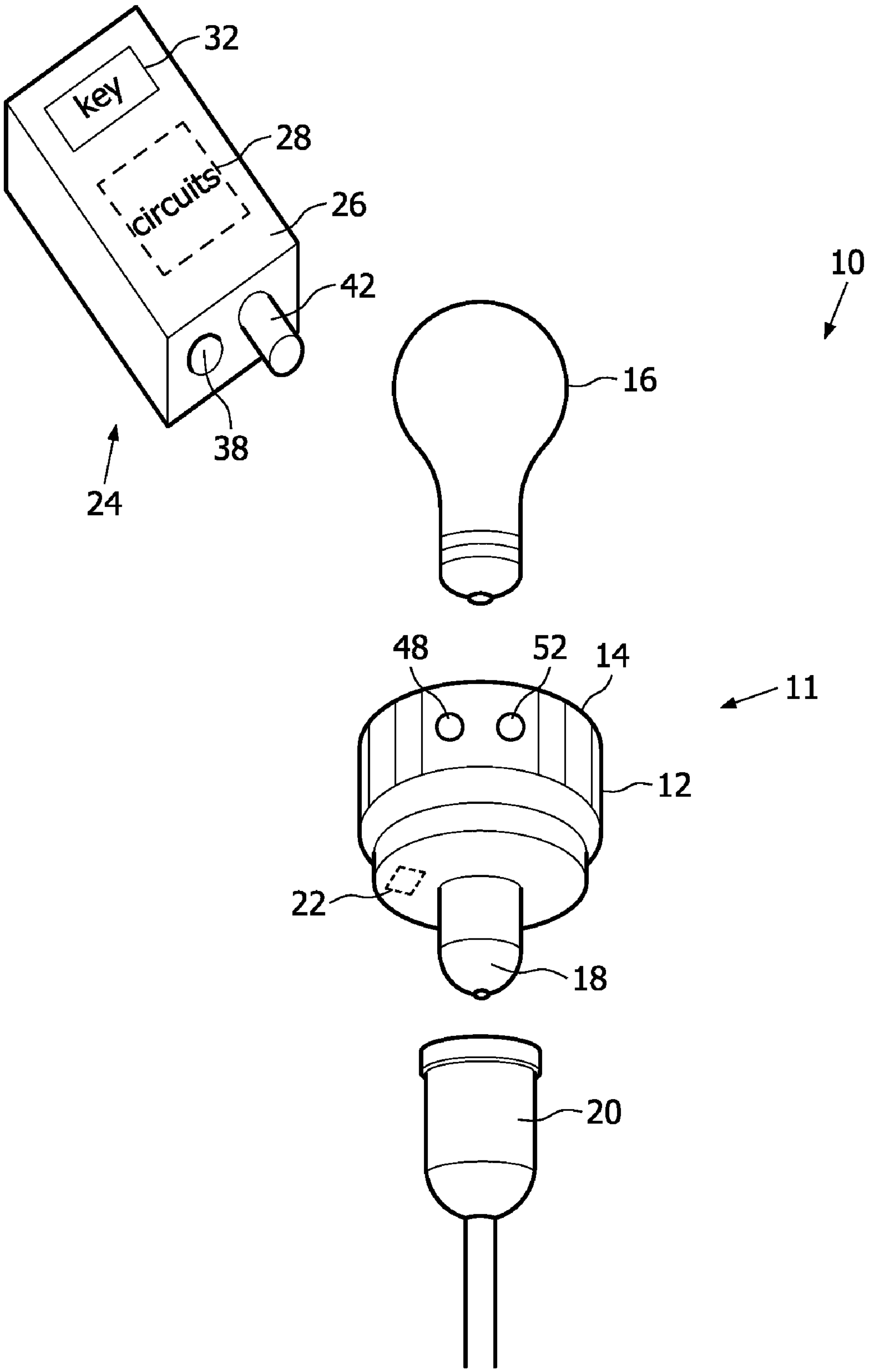
FIG. 1 is a perspective view showing a remote controller and a lamp socket having a remote controlled socket device.
Figure 2:
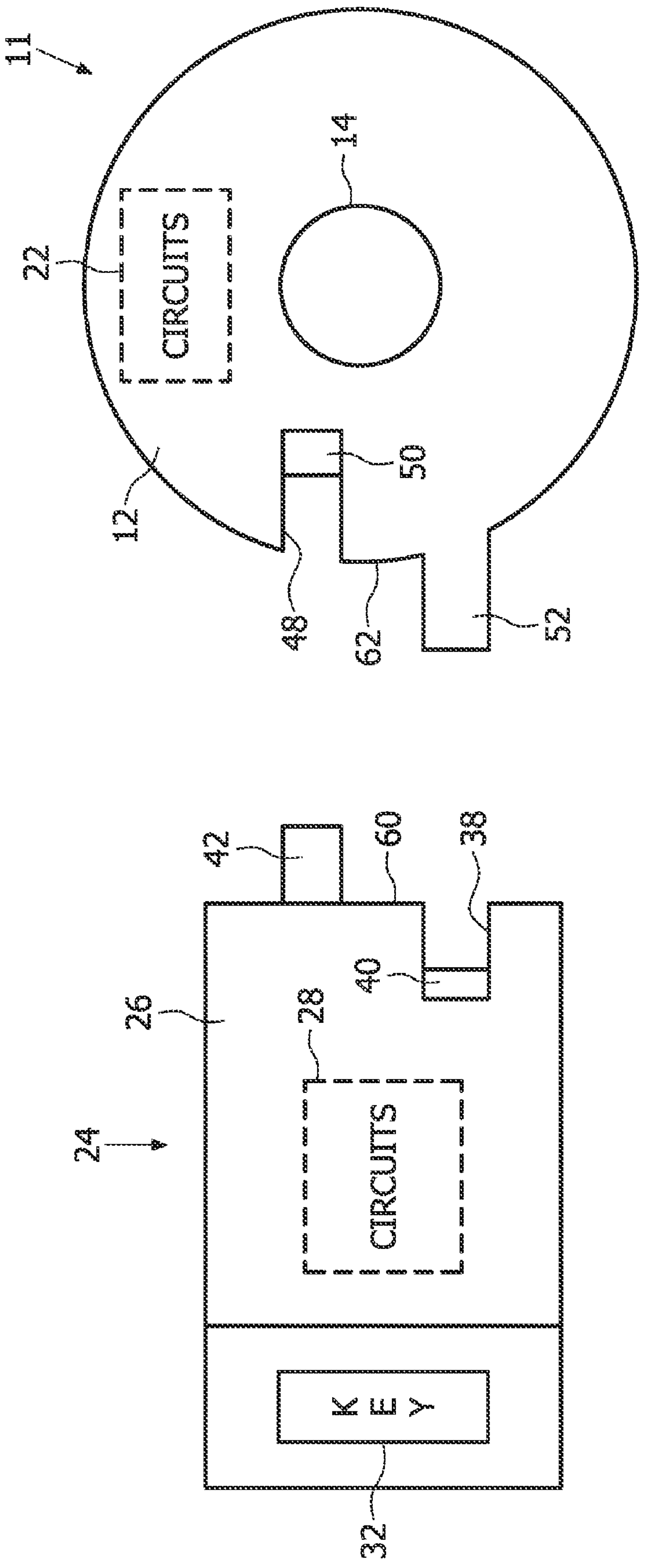
FIG. 2 is a plan view having parts broken away and in section to show mating elements of the remote controller and the remote controlled socket for commissioning an operating link between the remote controller and the remote controlled socket.

Referring to FIGS. 1 and 2, a lamp 10 includes a lamp socket adapter 11 having a molded plastic adapter housing 12, for example, in which a threaded light bulb socket 14 is provided for receiving a light bulb 16. The adapter housing 12 also has a threaded extension 18 for screwing into a lamp socket 20. The lamp socket adapter 11 contains receiver and switching electronics 22 housed within the adapter housing 12 for controlling the flow of current from the threaded extension 18 to the light bulb socket 14, for example, in response to wireless electrical signals received by the receiver and switching electronics 22. Of course, it should be understood that other devices may be used instead of a lamp socket adapter 11 such as wall socket adapter, as well as being integrated along with other electronic circuits which may be stand alone or integrated with bulbs, often referred to as integrated electronic bulbs.

A remote controller 24 includes a remote controller housing 26 in which a transmitter and other circuitry such as commissioning circuitry 28 are housed. The commissioning circuitry 28, as well as the switching electronics 22 of the adapter 11, may include control circuitry, processor, memory, modulator/demodulator, receiver, antenna, battery, as well as the transmitter and any other circuitry configured to allow control and/or communication operations of the remote controller 24 and adapter 11. The processor may be any type of controller or processor, such as those described in U.S. 2003/0057887, that is capable of providing control signals in response to input signals from a user interface (not shown), executing instruction stored in the memory, which may be any type of memory, RAM, ROM, removable memory, CD-ROM, and the like, also as described in U.S. 2003/0057887. The various circuit elements may be integrated together in any combinations or may be separate units interconnected together.

A push button 32 mounted on the remote controller housing 26 may be depressed to actuate the transmitter and cause it to wirelessly transmit electromagnetic signals (such as radio frequency (RF), infrared, ultrasound, optical or laser signals), or other electrical signals to the receiver and switching electronics 22 of the lamp socket adapter 11 to energize the receiver and switching electronics 22 and thereby control the controlled device or adapter 11 and bulb 16, e.g., either turn on or turn off the light bulb 16.

The remote controller 24 has a recess 38 (better shown in FIG. 2) formed within the remote controller housing 26 and a push button 40 that is mounted within the recess 38. The remote controller 24 also has a projecting stud 42 that is molded integrally with the molded plastic remote controller housing 26, for example.

The lamp socket adapter 11 has a recess 48 formed within the adapter housing 12 and a push button 50 that is mounted within the recess 48. The lamp socket adapter 11 also has a projecting stud 52 that is molded integrally with the adapter housing 12, for example.

The remote controller 24 and the lamp socket adapter 11 are configured to communicate with one another after commissioning or initialization that establishes and identifying link, where the remote control 24 and lamp socket adapter 11 become associated with each other so that the light source 16 attached to the lamp socket adapter 11 can be controlled by the remote control 24. Commissioning the link is established by having the user mate the remote controller 24 into the lamp socket adapter 11 by marrying the respective studs 42 and 52 with the corresponding recesses 48 and 38. In particular, as best seen in FIG. 2, the user will move the remote controller 24 into mating engagement with the lamp socket adapter 11 by inserting the stud 52 of the lamp socket adapter 11 into the recess 38 of the remote controller housing, thereby depressing and operating the button 40. The button 40 is connected to the transmitter and commissioning circuits 28 so that actuation of the button 40 will cause the transmitter 24 to emit a signal.

Simultaneously, the stud 42 of the remoter controller 24 becomes inserted into the recess 48 of the adapter housing 12 so that the stud 42 will depress and actuate the button 50 of the lamp socket adapter 11. The button 50 is connected to the receiver and switching electronics 22 so that actuation of the button 50 will cause the receiver and switching electronics 22 to receive and learn the signal that is being emitted by the transmitter of the remote controller 24.

In the event that the user were to lose the remote controller 24, as often happens, the user can purchase a replacement remote controller and then commission the operating link between that new remote controller and the lamp socket adapter 11 by mating the new remote controller with the lamp socket adapter 11 so that the lamp socket adapter will be reprogrammed to recognize and learn the wireless signal issued by the new remote controller, and thus become responsive and controllable by the new remote controller.

Referring again to FIG. 2, it will be seen and appreciated that the lamp socket adapter 11 and the remote controller 24 are particularly designed to prevent an inadvertent commissioning or re-commissioning of the wireless communication therebetween. In particular, the button 40 of the remote controller 24 and button 50 of the lamp socket adapter 11 are mounted sufficiently deep within their respective recesses so that the buttons will not be inadvertently depressed during normal use of the remote controller 24 and the lamp socket adapter 11. Furthermore, even if a user were to use a pencil or some other slender tool to depress the button 40 of the remote controller and thereby cause the transmitter to issue a commissioning signal, the lamp socket adapter 11 would not be initialized since it is not authorized to receive and learn the transmitted commissioning signal because the button 50 of the lamp socket adapter 11 would not be simultaneously depressed. Of course, the remote controller 24 may be configured to separately control and distinguish among different controlled devices, where unique identification is associated with each controlled device and is known to the remote controller for selection and control of a particular one of the multiple controlled devices.

It will also be appreciated that the aforedescribed method of physically mating the remoter controller 24 and the adapter 11 is user friendly and intuitive to the user. That is, the average user is quick to visually examine the remote controller 24 and the adapter 11 and intuit the manner in which the mating will be achieved. It would be very difficult for a user to simultaneously push separate commissioning buttons on a remote controller and a controlled device, but the aforedescribed mating system enables the simple act of physically mating the modules together to replace the awkward alternative of trying to simultaneously press commissioning buttons on two different devices.

Also, if desired, the mating can be made more intuitive by adding supplemental indicia to the remote controller and the controlled device. For example, one of the projecting studs, and its corresponding mating recess, may have different shapes that the other projecting stud and its corresponding mating recess. Illustratively, one of the projecting studs, and its corresponding mating recess, could have a square cross-section in order to better distinguish from the other stud/recess set which may have a round cross-section. Alternatively or in addition, one stud/recess set may, if desired, be color coded with the one color while the other stud/recess set may be color coded with a different color. For example, the color red may be used for one of the projecting studs and its mating recess, and the color green used for the other of the projecting studs and corresponding recess.

It should also be understood that the button 40, 50 need not be push type buttons. For example, in addition or in the lieu of the buttons, contacts may be included in both the remote controller 24 and adapter 11 which become electrically connected to upon mating the controller 24 and adapter 11, where in addition to commission, other data as well as power or electricity, e.g., for charging batteries, may be transferred through such mating electrical connectors. Such a connection provide a cost efficient way of data transfer, as compared to wireless data transfer using RFIDs, for example, thus dispensing the need for costly RFID readers and other circuitry.

FIG. 2 shows that the end wall 60 of the remote controller housing 26 is rectilinear and mates with the end wall 62 of the lamp socket adapter housing 12, which is also rectilinear. However, the end walls 60 and 62 may have unique shapes that will inform the user's intuition of the mateability of the remote controller 24 and the lamp socket adapter 11. For example the end wall 60 of the remote controller may be concave, and the controlled device may have a mating convex shaped, so that the user will intuit that the remote controller 24 and the lamp socket adapter 11 are intended to mate together like the pieces of a jig-saw puzzle.

The forgoing description of the invention is merely exemplary in nature and, thus, variations thereof are intended to be within the scope of the invention. For example, although the specific example discussed herein relates to a lamp socket adapter, the invention may be applied to wireless remote controller for appliances, thermostats, entertainment systems, and other systems where remote control is desirable.

Accordingly, it will be appreciated that all of the remote control modules in the household, such as key fob remote controllers, master controllers, wall switch controllers, as well as all of the controlled devices such as wall socket adapters, thermostats, appliances and the like will have mating structures provided thereon in order to provide user friendly commissioning of the requisite wireless link.

In addition, the arrangement of buttons within housing recesses is just one example of how the mating features of the remote controller and the adapter can be designed, and a person of ordinary skill in the art will recognize that other design specifics can be utilized within the concept of having the remote controller and the remote controlled device carry operating structural features configured to mate with one another like two pieces of a jig-saw puzzle, and then having that mating event trigger a transmission, learning and recognition process within the devices so that the controlled device is authorized to act upon signals whenever subsequently transmitted by the remote controller. Of course, any shape or type of complementary mating structures may be provided for the remote controller device and controlled device where any type of mating, physical or virtual may be used to initialize and establish a communication link between the remote controller device and the remote controlled device.

Finally, the above-discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

The invention claimed is:

1. A remote controller for controlling a controllable device connectable to an adapter, said remote controller comprising:

a controller mating portion configured to mate with an adapter mating part of said adapter;

a transmitter;

commissioning circuitry configured to establish wireless communication between said remote controller and said adapter to control said controllable device; and a controller actuator located at said controller mating portion, said controller actuator being configured to be activated when said controller mating portion mates with said adapter mating part thereby energizing said commissioning circuitry and complementary circuitry of said adapter, by causing said transmitter to emit a signal that can only be received by the adapter during a time when an adapter actuator of said adapter, located at said adapter mating part, is activated as a result of the mating, for establishing an identifying link to further said wireless communication between said remote controller and said adapter to control said controlled device, wherein said controller actuator and said adapter actuator can be independently activated.

2. The remote controller of claim 1, wherein said controllable device is a light source.

3. The remote controller of claim 1, wherein said controller actuator is located in a recess of said controller mating portion and is configured to be actuated together with said adapter actuator located in a further recess of said adapter mating part when said controller mating portion mates with said adapter mating part.

4. The remote controller of claim 1, wherein said controller mating portion includes a controller recess configured to mate with an adapter protrusion of said adapter mating part; and said adapter mating portion includes an adapter recess configured to mate with a controller protrusion of said controller mating part.

5. The remote controller of claim 1, wherein said controller mating portion includes a recess configured to mate with a protrusion of said adapter mating part.

6. The remote controller of claim 5, wherein said actuator is located within said recess.

7. The remote controller of claim 1, wherein said adapter mating portion includes a recess configured to mate with a protrusion of said controller mating part.

8. The remote controller of claim 7, wherein said adapter actuator of said adapter is located within said recess.

9. The remote controller of claim 1, wherein said controller mating portion and said adapter mating part include indicia of mateability.

10. An adapter for being controlled by a remote controller for controlling a controllable device connectable to said adapter, said adapter comprising:

an adapter mating part configured to mate with a controller mating portion of said remote controller;

adapter circuitry configured to establish wireless communication between said adapter and said remote controller;

and an adapter actuator located at said adapter mating part said actuator being configured to be activated when said adapter actuator mates with said controller mating portion thereby energizing said adapter circuitry and commissioning circuitry of said remote controller for establishing an identifying link to further said wireless communication between said controlled device and said remote controller, wherein energizing of said adapter circuitry allows said adapter circuitry to receive and learn a signal emitted by said remote controller, and wherein said signal emitted by said remote controller is only transmitted by said remote controller when a remote controller actuator, located at said controller mating portion, is activated as a result of the mating, wherein said remote controller actuator and said adapter actuator can be independently activated.

11. The adapter of claim 10, wherein said controllable device is a light source.

12. The adapter of claim 10, wherein said adapter actuator is located in a recess of said adapter mating part and is configured to be actuated together with a said remote controller actuator located in a further recess of said controller mating portion when said adapter mating part mates with said controller mating portion.

13. The adapter of claim 10, wherein said adapter mating part includes an adapter recess configured to mate with a controller protrusion of said controller mating portion; and said controller mating portion includes a controller recess configured to mate with an adapter protrusion of said adapter mating part.

14. The adapter of claim 13, wherein said adapter actuator is located within said adapter recess, and said remote controller actuator is located within said controller recess.

15. The adapter of claim 10, wherein said adapter mating part and said controller mating portion include indicia of mateability.

16. A method of commissioning an identifying link between a remote controller having a controller actuator and an adapter having an adapter actuator comprising the acts of:

mating a controller mating portion of said remote controller with an adapter mating part of said adapter, wherein mating comprises activating of both said controller actuator and said adapter actuator; and in response to said mating act, energizing commissioning circuitry of said remote controller and energizing complementary circuitry of said adapter, causing said remote controller to emit a signal that can only be received by said adapter when said adapter actuator is activated as a result of the mating, said energizing establishing said identifying link to further wireless communication between said remote controller and said adapter actuator for controlling a remote controlled device connectable to said adapter, wherein said controller actuator and said adapter actuator can be independently activated.

17. The method of claim 16, wherein said remote controlled device is a light source.

18. The method of claim 16, wherein controller actuator is located in a controller recess of said remote controller mating portion, and said adapter actuator is located in an adapter recess of said adapter mating part.

19. The method of claim 16, wherein said mating act includes inserting a controller protrusion of said controller mating part in an adapter recess of said adapter, and inserting an adapter protrusion of said adapter mating part in a controller recess of said controller mating portion.

20. The method of claim 16, wherein said controller mating portion and said adapter mating part include indicia of mateability.

* * * * *